United States Patent
Ishibashi

(10) Patent No.: US 10,313,028 B2
(45) Date of Patent: Jun. 4, 2019

(54) HUMAN BODY COMMUNICATION DEVICE, HUMAN BODY COMMUNICATION METHOD, AND PROGRAM

(71) Applicant: SONY MOBILE COMMUNICATIONS INC., Tokyo (JP)

(72) Inventor: Yoshihito Ishibashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/278,641

(22) Filed: Sep. 28, 2016

(65) Prior Publication Data

US 2017/0117972 A1     Apr. 27, 2017

(30) Foreign Application Priority Data

Oct. 22, 2015   (JP) ................... 2015-207822

(51) Int. Cl.
*H04B 5/00*     (2006.01)
*H04B 13/00*    (2006.01)

(52) U.S. Cl.
CPC ......... *H04B 13/005* (2013.01); *H04B 5/0031* (2013.01)

(58) Field of Classification Search
CPC ............................ H04B 13/005; H04B 5/0031
USPC ......... 455/41.1–41.3, 410, 411, 127.1, 127.2
See application file for complete search history.

(56) References Cited

U.S. PATENT DOCUMENTS

| | | | | |
|---|---|---|---|---|
| 6,754,472 B1 * | 6/2004 | Williams | ................ | H04Q 9/04 455/100 |
| 7,834,743 B2 * | 11/2010 | Nagata | ................ | G06K 19/0723 340/10.4 |
| 8,407,759 B1 * | 3/2013 | Sotos | ................ | H04L 69/14 370/328 |
| 2006/0223566 A1 * | 10/2006 | Brown | ................ | H04W 52/281 455/522 |
| 2007/0058563 A1 | 3/2007 | Ishibashi et al. | | |
| 2007/0149237 A1 * | 6/2007 | Russell | ................ | H04W 52/28 455/522 |
| 2007/0159301 A1 * | 7/2007 | Hirt | ................ | H04W 52/0216 340/10.1 |
| 2009/0298447 A1 | 12/2009 | Kim et al. | | |
| 2010/0029346 A1 * | 2/2010 | Liu | ................ | H04W 52/0241 455/574 |
| 2010/0289673 A1 * | 11/2010 | Kim | ................ | H04B 13/005 341/20 |
| 2011/0001724 A1 * | 1/2011 | Choi | ................ | G06F 3/0416 345/174 |

(Continued)

FOREIGN PATENT DOCUMENTS

| | | |
|---|---|---|
| EP | 2 129 014 A1 | 12/2009 |
| JP | 2012-39370 | 2/2012 |

OTHER PUBLICATIONS

Partial European Search Report dated Feb. 23, 2017 in Patent Application No. 16193992.1.

(Continued)

*Primary Examiner* — Edward F Urban
*Assistant Examiner* — Rui M Hu
(74) *Attorney, Agent, or Firm* — Xsensus LLP

(57) ABSTRACT

There is provided a human body communication device including a control unit configured to adjust a communication strength on the basis of information relevant to a process using human body communication.

14 Claims, 8 Drawing Sheets

(56) References Cited

U.S. PATENT DOCUMENTS

| | | | |
|---|---|---|---|
| 2012/0263219 A1 | 10/2012 | Kim et al. | |
| 2013/0142363 A1* | 6/2013 | Amento | H04K 1/00 |
| | | | 381/151 |
| 2013/0260816 A1* | 10/2013 | Plevridis | H01Q 1/243 |
| | | | 455/522 |
| 2015/0056921 A1 | 2/2015 | Schwartz et al. | |
| 2015/0147963 A1* | 5/2015 | Harada | H04W 52/0245 |
| | | | 455/41.1 |

OTHER PUBLICATIONS

Extended European Search Report dated Jun. 19, 2017 in Patent Application No. 16193992.1.
David B. Smith, et al. "Simple Prediction-Based Power Control for the On-Body Area Communications Channel," IEEE International Conference on Communications, XP031909081, 2011, pp. 1-5.

* cited by examiner

HUMAN BODY COMMUNICATION DEVICE, HUMAN BODY COMMUNICATION METHOD, AND PROGRAM

CROSS REFERENCE TO RELATED APPLICATIONS

This application claims the benefit of Japanese Priority Patent Application JP 2015-207822 filed Oct. 22, 2015, the entire contents of which are incorporated herein by reference.

BACKGROUND

The present disclosure relates to a human body communication device, a human body communication method, and a program.

In recent years, a human body communication technology that uses a human body as a communication medium is developed. The human body communication technology is a communication technology that utilizes electrostatic coupling between an electrode and a human body as a conductor. For example, if voltage is applied to electrodes when the human body contacts with the electrodes that are provided in a plurality of communication terminals, the electrodes and the human body are coupled electrostatically. By doing so, an electric field that is generated in a communication terminal is propagated through the human body, and another communication terminal receives the electric field via the human body. Thereby, communication can be performed between a plurality of communication terminals, only by the plurality of communication terminals and the human body contacting with each other.

A communication system of higher security can be established, by using this human body communication. For example, JP 2012-39370A discloses a technology relevant to a human body communication system for authenticating information of a high security level, like biometric information. With this technology, biometric authentication can be performed while maintaining security and convenience.

SUMMARY

However, when the human body communication is performed by using a human body communication device, it is possible that a user who uses the human body communication device unintentionally contacts with a third person or another human body communication device, and thereby communication that is not intended by the user is performed. Hence, it is desired to prevent leak of the information relevant to the user by the communication that is not intended by the user, while maintaining convenience for the user who utilizes the human body communication.

Thus, the present disclosure proposes a new and improved human body communication device, a human body communication method, and a program, which can achieve both of convenience of the user who utilizes the human body communication and safety of communication.

According to the present disclosure, there is provided a human body communication device including: a control unit configured to adjust a communication strength on the basis of information relevant to a process using human body communication.

According to the present disclosure, there is provided a human body communication method including: adjusting, by a processor, a communication strength on the basis of information relevant to a process using human body communication.

According to the present disclosure, there is provided a program for causing a computer to function as a control unit configured to adjust a communication strength on the basis of information relevant to a process using human body communication.

As described above, according to the present disclosure, both of the convenience of the user who utilizes the human body communication and the safety of the communication can be achieved.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
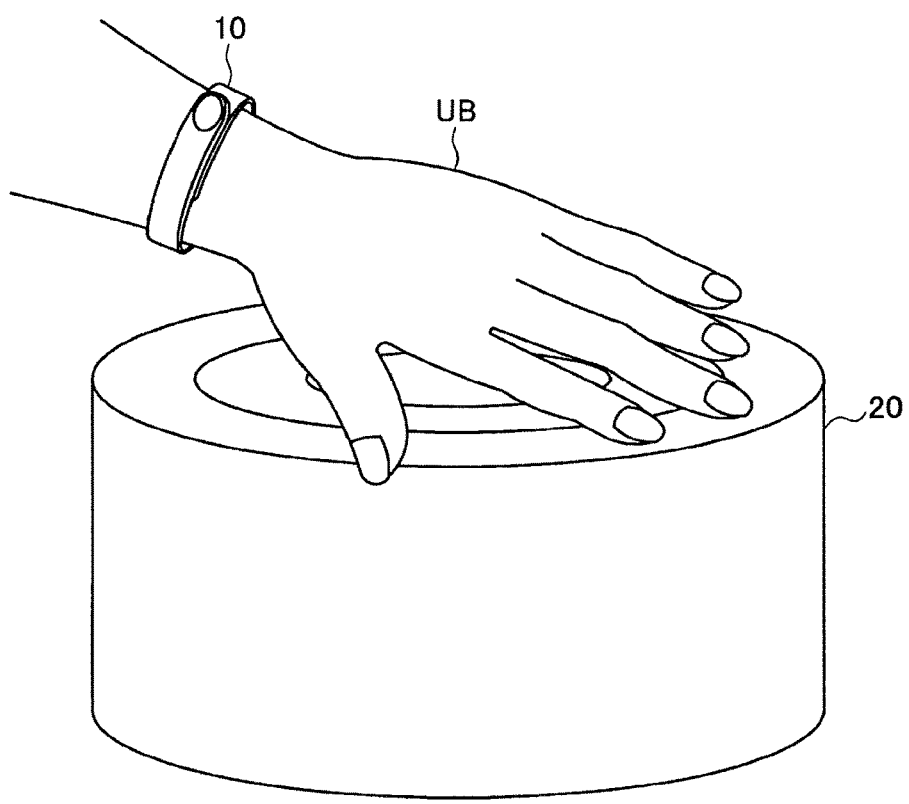
FIG. 1 is a diagram illustrating an overview of a configuration of a human body communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be made in the following order.
1. Overview of Human Body Communication System
2. Configuration of Human Body Communication Device
3. Adjustment Example of Communication Strength
4. Communication Process Example
5. Exemplary Hardware Configuration
6. Conclusion

1. OVERVIEW OF HUMAN BODY COMMUNICATION SYSTEM

FIG. 1 is a diagram illustrating an overview of a configuration of a human body communication system 1 according to an embodiment of the present disclosure. As illustrated in FIG. 1, the human body communication system 1 can be configured with a band 10 as a human body communication device, and a communication terminal 20 as a human body communication device. In the human body communication system 1 according to the present embodiment, the band 10 and the communication terminal 20 perform communication by a human body communication scheme via a body UB of a user.

Here, the human body communication scheme used in the human body communication system 1 according to the present embodiment will be described simply. Electrodes are provided on parts of surfaces of the band 10 and the communication terminal 20. When these electrodes contact with or get close to the body UB of the user in a state in which voltage is applied to the electrodes, the body UB of the user and the electrodes couple electrostatically. An electric field is generated in the body UB of the user, on the basis of this electrostatic coupling. The body UB of the user is assumed as a conductor, and therefore the body UB of the user plays a role of a communication medium that connects between a plurality of communication devices. That is, when information is transmitted by using the human body communication from the band 10 for example, the electric field that is generated at the band 10 propagates on the body UB of the user (for example, a superficial layer of the body UB of the user), and the electric field is detected at the communication terminal 20. Thereby, the communication terminal 20 can receive the information that is transmitted from the band 10 by the human body communication. Note that the communication medium is assumed to be the human body in the present embodiment, but the present technology is not limited to this example. For example, the communication medium that mediates the electric field includes conductors other than the human body. Also, the human body communication system 1 according to the present embodiment may perform communication via a plurality of communication media (for example, the human body, and a space that exists between the human body and the human body communication devices).

Note that electric field strength generally becomes lower according to a propagation distance between the communication devices, in the electric field that is transmitted from one of the communication devices. Hence, it is possible that, when the strength of the transmitted electric field is low, the information is transmitted from a transmission side is not conveyed to a reception side. On the other hand, it is possible that, when the strength of the transmitted electric field is high, the electric field is transmitted from the transmission side propagates not only through the body UB of the user, but also through a space. In this case, the electric field propagates through two types of communication media including the human body and the space in the reception side, and those cancel each other, so that the information transmitted from the transmission side is unable to be read in some cases. Hence, when the human body communication is performed between the communication devices, the communication devices are requested to convey the information in an appropriate communication strength. Note that, according to an experiment, it is known that the signal strength fluctuates according to elements other than propagation distance. For example, it is known that the signal strength fluctuates according to a part where the electric field that propagates through the conductor contacts the conductor and another communication device or another conductor. More specifically, it is known that the signal strength becomes stronger in four limbs such as a finger or a foot of a human body or a head, and the signal strength becomes weaker in a torso such as a chest or a lower back.

In an example illustrated in FIG. 1, the user that wears the band 10 on the arm puts the hand of the side that wears the band 10 on the communication terminal 20. By doing so, the band 10 and the communication terminal 20 can perform human body communication via the body UB of the user.

Note that the human body communication device is configured with a form like the band 10 or the communication terminal 20 in the present embodiment, but the form of the human body communication device according to the present embodiment is not limited particularly. For example, the human body communication device is not limited to a device form like the portable (wearable) band 10 or the stationary communication terminal 20. Specifically, the portable human body communication device may be configured with a form of an accessory such as a watch, an earring, or a necklace, and may be a form that adheres to clothes, a belt, a shoes, a wallet, a bag, or the like, and may be a form that adheres to a smartphone, a mobile phone, a tablet, a notebook PC, or a like of the past. Also, the stationary human body communication device may be a terminal that is used in a near field communication (NFC) device or the like of the past, and may be a terminal that accompanies each equipment of a vehicle, a button of an automatic vending machine, a home electrical appliance device, an audio device, building equipment, or the like.

The human body communication system 1 illustrated here can be applied to a payment process of electronic money, or a process relevant to personal information such as login management or unlocking process, for example. For example, when the communication terminal 20 is provided in an automatic ticket gate or a fare adjustment machine of means of transportation or the like, the user who wears the band 10 can perform a fare adjustment process or the like, only by touching the communication terminal 20.

Also, when the communication terminal 20 is provided at an entrance of a room of a building, the user who wears the band 10 touches the communication terminal 20, in order to unlock the door of the entrance, and perform authentication of attendance and leaving. In this case, the band 10 may be worn by an animal such as a dog or a cat, for example. By doing so, the door of the entrance can be controlled to open automatically, when the cat that wears the band 10 touches the communication terminal 20 that is provided at the entrance of the room of the building, for example. Thereby, only the cat that wears the band 10 can enter and leave the building.

In addition, when the communication terminal 20 is provided in a seat, a steering wheel, or the like of a driver's seat of a vehicle such as a car for example, the user who wears the band 10 only sits the seat or holds the steering wheel, in order to automatically perform adjustment of positions of a mirror, the seat, the steering wheel, air conditioning, audio, or the like, according to the user.

Also, when the communication terminal 20 is provided in a speaker of an audio device, the user who wears the band 10 may touch the communication terminal 20, in order to control the audio device to make sound from the speaker. Further, for example, when the communication terminal 20 is provided in a part of an automatic vending machine, the user who wears the band 10 touches the communication terminal 20 when purchasing the coffee, so that the automatic vending machine can provide the user with the coffee that is adjusted automatically according to the preference of the user with regard to the amount of sugar and milk.

As described above, the human body communication system 1 can reduce the burden of the user who uses the communication device such as the band 10. For example, when communication is performed with another communication device by the communication device that uses the NFC communication, the user has been requested to get the communication device close to the other communication device. In this case, the position adjustment of the NFC communication antenna provided in the communication device is to be performed at a high accuracy, and thus the position adjustment becomes difficult, depending on the communication device, so as to load a burden on the user. Thus, by using the human body communication instead of the NFC communication, the user only touches another communication device or brings the body close to another communication device, in order to perform the communication. Thus, there is an advantage that the convenience of the user improves.

However, when the human body communication is performed by using the above described communication device, there has been a possibility that the user who uses the communication device unintentionally contacts with a third person or another human body communication device, and thereby the communication that is not intended by the user is performed. Thereby, there has been a possibility that information relevant to the user leaks, and the information relevant to the user is utilized fraudulently.

Figure 2:
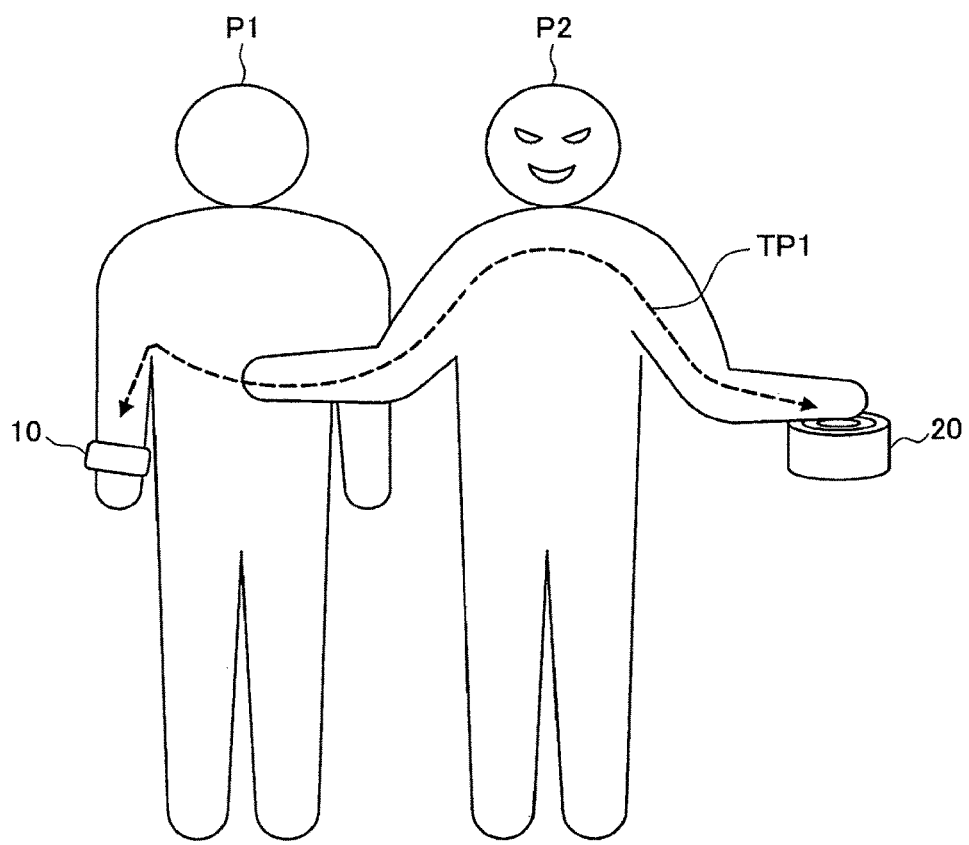
FIG. 2 is a diagram illustrating an example of human body communication via a body of another person by a human body communication system.

FIG. 2 is a diagram illustrating an example of the human body communication via the body of another person by the human body communication system. As illustrated in FIG. 2, if another person P2 touches both of a person P1 and the communication terminal 20 when the person P1 wears the band 10, the band 10 and the communication terminal 20 can form a communication channel TP1 in the bodies of the person P1 and the person P2, in order to perform human body communication via the communication channel TP1. In this case, when the payment process is executed between the band 10 and the communication terminal 20 for example, the person P1 does not touch the communication terminal 20, but it is conceived that the band 10 and the communication terminal 20 execute the payment process, and the balance of the electronic money reduces before one knows, for example. In this case, the person P2 does not wears the band 10, but it is assumed as if the person P2 perform the payment, and thus it is also conceived that the person P2 uses the electronic money of the person P1 fraudulently. Even if the person P2 does not have a fraudulent purpose, there is a possibility that the band 10 and the communication terminal 20 performs a payment process erroneously, in a state in which the person P2 touches the body of the person P1. In addition, a third person who holds a device that can skim the personal information via the human body communication touches the body of the person P1, and thereby there is a possibility that the personal information stored in the band 10 that the person P1 wears is read by the third person. Hence, when the secure communication is performed via the human body communication, the safety of the communication is desired to be higher.

Thus, the human body communication system 1 according to the present embodiment adjusts the communication strength of the human body communication device on the basis of information relevant to a process using the human body communication. For example, the human body communication system 1 performs the adjustment that reduces the communication strength of the human body communication device, when communicating information of a high security level, such as a payment process or a process relevant to personal information. Also, the human body communication system 1 may perform adjustment that increases the communication strength of the human body communication device, when communicating information of a comparatively lower security level, such as exchanging e-mail addresses by handshake or the like. This technology limits the distance through which the information transmitted from the human body communication device is conveyed on the human body, and therefore can prevent incorrect read or the like of the information by the contact or the like of the third person. Thereby, the safety of the communication can be kept, while maintaining the convenience of the user.

In the above, the overview of the human body communication system 1 according to the present embodiment has been described. Next, an exemplary specific configuration and an exemplary communication process of the human body communication device according to the present embodiment will be described.

2. CONFIGURATION OF HUMAN BODY COMMUNICATION DEVICE

Figure 3:
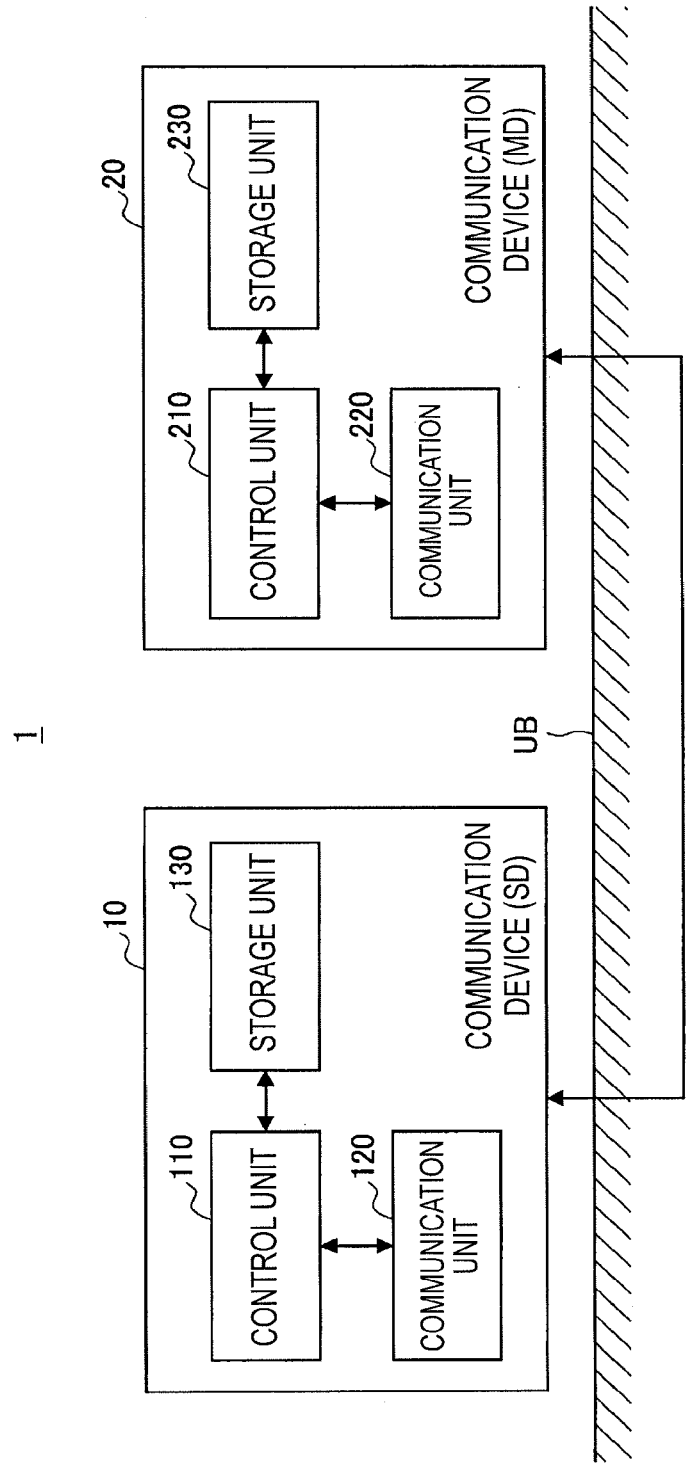
FIG. 3 is a block diagram illustrating an exemplary function and configuration of a communication device according to this embodiment.

FIG. 3 is a block diagram illustrating exemplary functions and configurations of the communication device 10 and the communication device 20 according to an embodiment of the present disclosure. The communication device 10 and the communication device 20 according to the present embodiment have the same function and configuration, and thus the function and configuration of the communication device 10 will be described in the following. Note that, when the roles (a master side and a slave side) in the communication process are distinguished in the description of the present embodiment, the communication device 10 is also referred to as a slave device (SD), and the communication device 20 is also referred to as a master device (MD). For example, in the example illustrated in FIG. 1, the band 10 may be the SD, and the communication terminal 20 may be the MD. Also, the role of each communication device in the communication process by the communication device 10 and the communication device 20 is needless to be distinguished into the master side or the slave side. For example, when a predetermined communication process is performed, the communication device 20 may reply to a request from the communication device 10, and the communication device 10 may reply to a request from the communication device 20.

Referring to FIG. 3, the communication device 10 includes a control unit 110, a communication unit 120, and a storage unit 130.

(Control Unit)

The control unit 110 controls overall operation of the communication device 10. Specifically, the control unit 110 controls the communication unit 120. For example, the control unit 110 starts and stops a human body communication function by the communication unit 120. Also, the control unit 110 instructs transmission of data to another communication device by the communication unit 120, and performs a process relevant to the data that is acquired from another communication device by the communication unit 120. Further, the control unit 110 according to the present embodiment performs the adjustment of the communication strength of the communication unit 120. Here, the adjustment of the communication strength in the present embodiment includes any one of adjustment of transmission strength or adjustment of reception strength. The adjustment of the transmission strength in the present embodiment is changing a voltage value of the voltage that is applied to an electrode to output a signal from the communication unit 120 described later (i.e., adjusting a transmission gain). For example, when the transmission strength is made smaller, the control unit 110 instructs the communication unit 120 to makes the transmission gain smaller. Also, the adjustment of the reception strength in the present embodiment means adjusting a capturable level of a signal that the communication unit 120 described later tries to capture at the electrode (i.e., adjusting the reception gain). For example, when the reception strength is made smaller, the control unit 110 instructs the communication unit 120 to make the reception gain smaller. An adjustment example of the communication strength by the control unit 110 will be described later. Note that the control unit 110 is configured with a processing circuit such as a CPU that is included in the communication device 10. Also, a part of the control unit 110 may be configured with a microcomputer which is referred to as security element (SE). The SE performs a process relevant to security, such as data access control.

(Communication Unit)

The communication unit 120 has a function for performing communication with another communication device via the human body. Specifically, the communication unit 120 transmits the information that is instructed to transmit to another communication device from the control unit 110, via the human body, by controlling the voltage value that is applied to the electrode that is provided in the communication device 10. Also, the communication unit 120 receives the information transmitted via the human body from another communication device by using the electrode, and outputs the received information to the control unit 110. When there is an instruction for adjusting the transmission strength from the control unit 110, the communication unit 120 according to the present embodiment changes the output of a signal in accordance with the instruction. For example, the communication unit 120 may change the transmission gain, in accordance with the instruction relevant to the transmission strength from the control unit 110. Also, the reception gain may be changed in accordance with the instruction relevant to the reception strength from the control unit 110.

Note that the communication unit 120 may have a function for performing wireless or wired communication or the like, in addition to the human body communication. For example, the communication unit 120 may have a function for performing proximity communication by NFC or the like.

(Storage Unit)

The storage unit 130 has a function that stores various types of information in the communication device 10. For example, the storage unit 130 stores the information that is acquired by the communication with another communication device. This information includes information relevant to a process that is executed by the communication with another communication device, such as information relevant to payment process (balance or payment history of electronic money, etc.), or personal information (name, e-mail address, telephone number, etc.), for example. Also, the storage unit 130 stores the information for establishing connection with another communication device. This information also includes device information for establishing connection with another communication device by using the human body communication, security information, and the like. Note that an acquisition unit that acquires the above described information from the outside of the communication device 10 may be included, instead of the storage unit 130. Note that the storage unit 130 is configured with a storage device such as a random access memory (RAM), a hard disc drive (HDD), a solid state drive (SSD), or a flash memory, which are included in the communication device 10.

In the above, the exemplary configuration of the communication device 10 according to the present embodiment has been described. Note that the exemplary configuration of the communication device 20 and the function of each component is the same as the communication device 10, and thus the description will be omitted. Also, in the following description, "communication" means "human body communication", if not distinguished particularly.

3. ADJUSTMENT EXAMPLE OF COMMUNICATION STRENGTH

As described above, the control unit 110 according to the present embodiment performs the adjustment of the communication strength in the data transmission. Specifically, the control unit 110 performs the adjustment of the communication strength on the basis of information relevant to a process using the human body communication. In this case, the communication strength of the adjustment target may be the transmission strength in the data transmission by the communication unit 120 of the communication device 10, and may be the transmission strength in the data transmission by the communication unit 220 of the communication device 20 which is the communications partner. Also, the communication strength of the adjustment target may be the reception strength in the data reception by the communication unit 120 of the communication device 10, and may be the reception strength in the data reception by the communication unit 220 of the communication device 20 which is the communications partner.

For example, the control unit 110 may adjust the communication strength by the communication unit 120, when starting a predetermined process with another communication device via communication. In detail, when the process is a payment process or the like, communication of a high security is to be performed, and thus the control unit 110 may make the communication strength lower. Thereby, the distance within which the communication device 10 can convey the communication becomes shorter. Thus, for example, even if another person touches the stationary communication device 20 in a state in which that the other person touches the user that wears the communication device 10, there is a communication distance for two persons, in addition to attenuation when the signal propagates from person to person, the distance between the communication device 10 and the communication device 20 exceeds a transmissible distance of the communication device 10, and a possibility that the communication between the communication device 10 and the communication device 20 is not performed becomes higher. Thus, a fraudulent process to the communication device 10 by the other person can be prevented.

Also, the control unit 110 may adjust the communication strength, on the basis of an application that executes a process, processed information, a connection state of the communication, a type or a state of the communication device of the communications partner, or the like, for example. In the following, an adjustment example of the communication strength by the control unit 110 (210) will be described. Note that the communication device 10 and the communication device 20 will be denoted as the SD 10 and the MD 20, to distinguish the role of each communication device.

(Adjustment Based on Process Detail or Security Level)

For example, the control unit 110 may adjust the communication strength on the basis of the information relevant to the process executed by the application. Here, the application is an application that operates on the basis of a program stored in at least one of the storage unit 130 of the SD 10 or the storage unit 230 of the MD 20. The application includes an application relevant to financial transaction, an application for exchanging personal information, an application for performing adjustment of each equipment of a vehicle, or the like, for example.

A security level is set for each process respectively, with respect to the process executed by this application. The security level is an index indicating a confidential degree of information, and is decided according to the process that is executed by the application. This process also includes at least one individual process that is included in one process. For example, a financial transaction process that is executed by the application includes a payment process, a point confirmation process, a payment history confirmation process, or the like. In this case, the payment process is a process that directly increases and decreases the electronic money that the user owns, and thus the security level can be set higher as compared with other processes. On the other hand, the point confirmation process and the payment history confirmation process are processes that include the personal information but is not processes for increasing and decreasing the electronic money that the user owns, and thus the security level can be set lower as compared with the payment process. That is, the security level may be set for each process, according to the individual process that is included in the financial transaction process. Thereby, the control unit 110 can adjust the communication strength, depending on the security level of each process that is included in one process. Thus, an important process can be performed more safely. Also, the security level may be set on the basis of the information that is handled in at least one process. For example, the security level may be set according to the size of the payment amount, in the payment process. More specifically, the security level is set low when the payment amount is a small amount like 100 Japanese yen in the payment process, and the security level may be set high when the payment amount is a large amount like 10000 Japanese yen. Thereby, the control unit 110 can adjust the communication strength, according to the handled payment amount. Thus, the process in the communication can be performed more efficiently.

Also, the control unit 110 may adjust the communication strength depending on the above security level. For example, as the security level is higher, the control unit 110 may make the communication strength lower, and as the security level is lower, the control unit 110 may make the communication strength higher. As described above, it becomes easy to appropriately adjust the communication strength, by setting the security level in advance for each process that is executed in the application. Note that, when the transmission strength is adjusted, if the transmission strength is adjusted high casually, it is highly possible that the signal that is communicated via the human body propagates through the space. Hence, the control unit 110 may adjust the transmission strength not higher than a predetermined upper limit value.

The adjustment method of the communication strength according to the security level is not limited particularly, and for example, the communication strength may be adjusted continuously or in a step-by-step manner, according to the value of the security level or the like. For example, when a predetermined threshold value and a predetermined strength is set in advance with regard to the security level, the control unit 110 may set the communication strength lower than the predetermined strength when the security level is higher than the predetermined threshold value, and may set the communication strength higher than the predetermined strength when the security level is equal to or smaller than the predetermined threshold value. The predetermined threshold value may be provided in plurality, and the control unit 110 may adjust the communication strength, according to classifications which are divided by each threshold value and which the security level belongs to.

(Timing of Communication Strength Adjustment)

The timing for performing the communication strength adjustment by the control unit 110 may be decided on the basis of a communication state between the communication devices, a notification from the communications partner, or the like.

For example, when the SD 10 executes a predetermined process with the MD 20 via the human body communication, the control unit 110 may adjust the communication strength, on the basis of the notification of the process from the MD 20. Specifically, when the SD 10 and the MD 20 establish connection and start the process, if the SD 10 receives the notification indicating a start of the process from the MD 20, the control unit 110 may adjust the communication strength. Thereby, the communication strength generated when the information is transmitted from the SD 10 to the MD 20 becomes the communication strength that is adjusted by the control unit 110 (for example, the low strength) when the process is executed. Thus, for example, when the security level of the process is high, the communication strength is adjusted low while the process is executed, in order to perform safer communication.

Also, in the above example, the MD 20 notifies the start of the process to the SD 10, and the SD 10 that has received the notification adjusts the communication strength, but conversely the MD 20 may adjust the communication strength, when starting the process. Specifically, the control unit 210 of the MD 20 may adjust the communication strength of the communication unit 220 of the MD 20 on the basis of the state of the connection with another communication device such as the SD 10. More specifically, the MD 20 may adjust the communication strength of the communication unit 220, depending on whether or not the communication connection has been established with the communication device which is the communications partner. More specifically, the MD 20 may adjust the communication strength of the MD 20, after a session with the SD 10 has established.

For example, when the MD 20 sends the beacon or the like to search for the communication device, the control unit 210 may adjust the transmission strength of the communication by the communication unit 220 high. On the other hand, the control unit 210 may adjust the transmission strength of the communication by the communication unit 220 low, after the SD 10 which is the communications partner is detected, and the communication connection with the SD 10 is established. Thereby, the success rate of the search of the communication device can be improved before the communication connection is established, and the security of the communication can be enhanced after the communication connection is established.

Note that, when the MD 20 performs a process of a high security as the master side, it is preferable to adjust the communication strength of the MD 20 during the communication between the SD 10 and the MD 20. In general, it is highly possible that the master side is configured with a fixed communication device. In this case, various and complicated processes are possible in the fixed communication device, and thus the security of the communication device of the master side can be more secure than the security of the communication device of the slave side. Hence, adjusting the communication strength of the MD 20 low is considered to maintain the safety of the communication more unfailingly than transmitting the notification of the process to the SD 10 and adjusting the communication strength of the SD 10 low. Moreover, the MD 20 may perform not only the adjustment of the communication strength of the MD 20, but also the adjustment of the communication strength of the SD 10 side. The conveyance range of the communication between the SD 10 and the MD 20 can be limited more finely, by adjusting the communication strengths of both of the SD 10 and the MD 20.

(Process According to Type of Communication Device)

Also, the control unit 110 may adjust the communication strength depending on the type of the communication device of the process target in the communication. For example, as illustrated in FIG. 1, when the SD 10 is a portable terminal, and the MD 20 is a stationary terminal, the user who wears the SD 10 touches the MD 20, and thereby the SD 10 and the MD 20 perform a process in the communication via the body of the user.

On the other hand, when the communication devices that perform the human body communication are both portable terminals, the communication is performed via the body between a plurality of users in some cases. As described above, when the human body communication is performed via a plurality of users, there is a possibility that the communication is cut off by the contact state of the bodies of a plurality of users, depending on the location of the contact between a user and another user (for example, the contact of the users by handshake or hug). Hence, the control unit 110 (210) may adjust the communication strength high, in order to transmit the information unfailingly to the communications partner. Thereby, the information can be transmitted more unfailingly to the communications partner, even when the human body communication is performed via the bodies of a plurality of users.

Note that, when the communication strength is adjusted depending on the type of the communication device, the communication device 10 may acquire the information (model, specification, maker, etc.) relevant to the type of the communication device which is the communications partner, at the time of the establishment of the communication with the communications partner, and adjust the communication strength according to the acquired information, for example.

(Readjustment of Communication Strength)

Also, the control unit 110 may readjust the communication strength that is adjusted according to the process via the communication, at a predetermined timing. For example, the control unit 110 may set the communication strength back to the original communication strength. Thereby, the state can set back to before the start of the process. More specifically, the control unit 110 may set back to the transmission strength according to the search process after a payment process ends, when making the transmission strength lower in the payment process, when performing the search process for searching for another communication device and the payment process for the payment. Thereby, the transmission strength for the search process can be obtained, after the payment process ends.

For example, the control unit 110 may readjust the communication strength, after a predetermined time has elapsed from the adjustment of the communication strength which is performed previously. More specifically, the control unit 110 may set back the communication strength to the original state, after performing a predetermined process for a predetermined time from the adjustment of the communication strength. The predetermined time may be decided according to the type of the process or the like. Thereby, the security of the communication can be enhanced, according to the time that is used to perform a specific process.

Also, the control unit 110 may readjust the communication strength, after the process ends in the communication. For example, the control unit 110 may set back the communication strength that is adjusted previously, to the original state, after a series of processes ends in the communication with the MD 20. Thereby, the security of the communication can be enhanced while the specific process is performed, and the communication state can be efficiently switched to the communication state in a steady state such as standby, after the process ends.

Also, the control unit 110 may readjust the communication strength, after a notification is sent from another communication device which is the communications partner. For example, the control unit 110 of the SD 10 may set back the communication strength to the original state, when receiving a notification that includes an instruction for readjusting the communication strength that is adjusted previously, from the MD 20, while executing the process via the communication with the MD 20. More specifically, when the information amount that is transmitted and received is large, and the process takes time, the MD 20 may transmit to the SD 10 a notification for instructing to perform the adjustment that sets back the transmission strength to the original state, in the middle of the process via the communication. The SD 10 that receives the notification sets back the transmission strength to the original state, and thereby the processing time is shortened. Thus, the convenience of the user can be maintained.

Further, the control unit 110 may adjust the communication strength in accordance with the consumption state of the electric power of the SD 10. For example, the control unit 110 may adjust the communication strength, according to the stored electricity amount of the SD 10. More specifically, the communication strength may be adjusted low, when the stored electricity amount of the SD 10 is small. Thereby, the consumption of the electric power can be reduced, and the SD 10 can be driven for a longer time. Also, the control unit 110 may adjust the communication strength, according to the process detail that is executed by the SD 10. For example, the communication strength may be adjusted low, while the process whose electric power consumption is large, such as the image processing, is executed. Thereby, the consumption amount of the electric power of the SD 10 can be reduced.

In the above, an adjustment example of the communication strength by the control unit 110 (210) has been described. As described above, the adjustment amount, the adjustment timing, or the like of the communication strength can be set as appropriate according to the communication state of the communication device 10 or 20 or the like. Note that whether the adjustment of the communication strength adjusts the transmission strength or the reception strength can be set as appropriate according to the specification, the communication state, or the like of the communication device 10 or 20.

4. COMMUNICATION PROCESS EXAMPLE

<4.1. First Communication Process Example (when Making Transmission Strength of SD Lower)>

Figure 4:
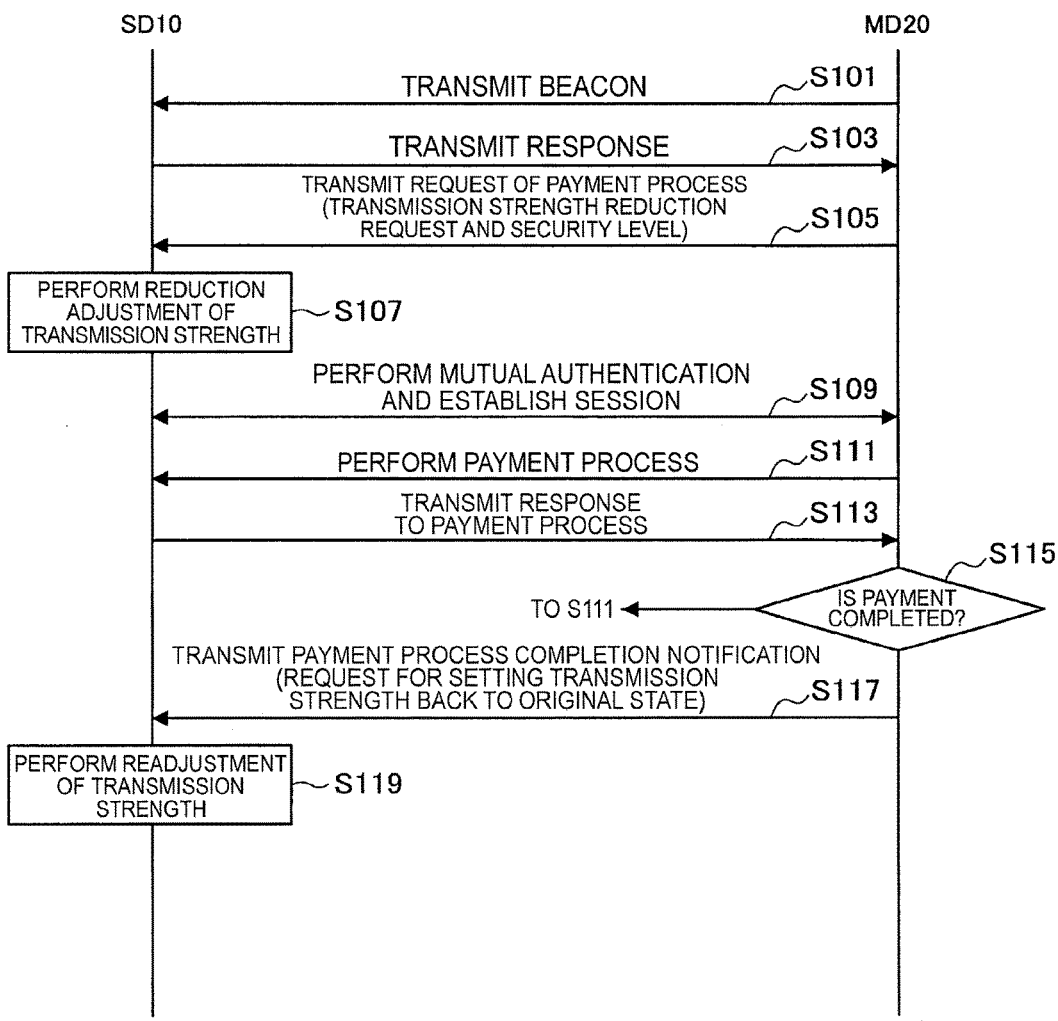
FIG. 4 is a sequence diagram for describing a first communication process example of a human body communication system according to this embodiment.

Next, with reference to FIG. 4, a first communication process example of the human body communication system 1 according to the present embodiment will be described. FIG. 4 is a sequence diagram for describing the first communication process example of the human body communication system 1 according to the present embodiment. The first communication process example is an example in which the user performs the payment process with the stationary communication device 20 (the MD 20) by using the portable communication device 10 (the SD 10). Here, an example that adjusts the transmission strength of the SD 10 will be described.

First, the SD 10 receives a beacon that is transmitted to allow the MD 20 to detect the communication device which is the target of the payment process (S101). The beacon is a signal that is cyclically sent from the MD 20. The SD 10 that has received the beacon transmits a response to the MD 20 (S103).

The MD 20 that has received the response requests the SD 10 to perform the payment process (S105). At this time, the request includes a request for reducing the transmission strength of the SD 10, and information relevant to the security level of the payment process. The SD 10 that has received the request of the payment process performs the adjustment that reduces the transmission strength of the SD 10 depending on the security level that is included in the received information (S107).

When the adjustment of the reduction of the communication strength by the SD 10 is completed, a mutual authentication process is performed between the SD 10 and the MD 20, and the session is established (S109). Note that the adjustment of the reduction of the transmission strength of the SD 10 which is executed in step S107 may be performed after the mutual authentication process or the establishment of the session. That is, the transmission strength may be adjusted before a time point at which the payment process starts.

When the session is established, the payment process is performed between the SD 10 and the MD 20 (S111). Specifically, an instruction relevant to the payment process (for example, an instruction for balance confirmation or monetary amount decrease) is transmitted from the MD 20 to the SD 10, and the SD 10 transmits the information relevant to the reply to the instruction, to the MD 20 (S113). The payment process and its reply of step S111 and step S113 are repeatedly executed until the payment process is completed (S115).

When the payment process is completed, the MD 20 transmits a completion notification of the payment process to the SD 10 (S117). At this time, the MD 20 may transmit a request for setting the transmission strength back to the original state, to the SD 10. Next, the SD 10 performs readjustment such as setting back the transmission strength to the original state, in accordance with the notification (S119). Note that the SD 10 may readjust the transmission strength, according to the timing when the session with the MD 20 is closed after the completion of the payment process.

In the above, the first communication process example has been described. According to the present exemplary process, the SD 10 makes the transmission strength of the SD 10 lower, according to each notification from the MD 20. Thereby, the SD 10 can make the transmission strength lower at a timing that is set in advance in the process with the MD 20. Thus, the SD 10 can make the transmission strength lower at an appropriate timing, in a process in which a high security level is requested, such as the payment process or the like. Thus, the convenience of the user and the safety of the communication can be maintained.

<4.2. Second Communication Process Example (when Making Transmission Strength of MD Lower)>

Figure 5:
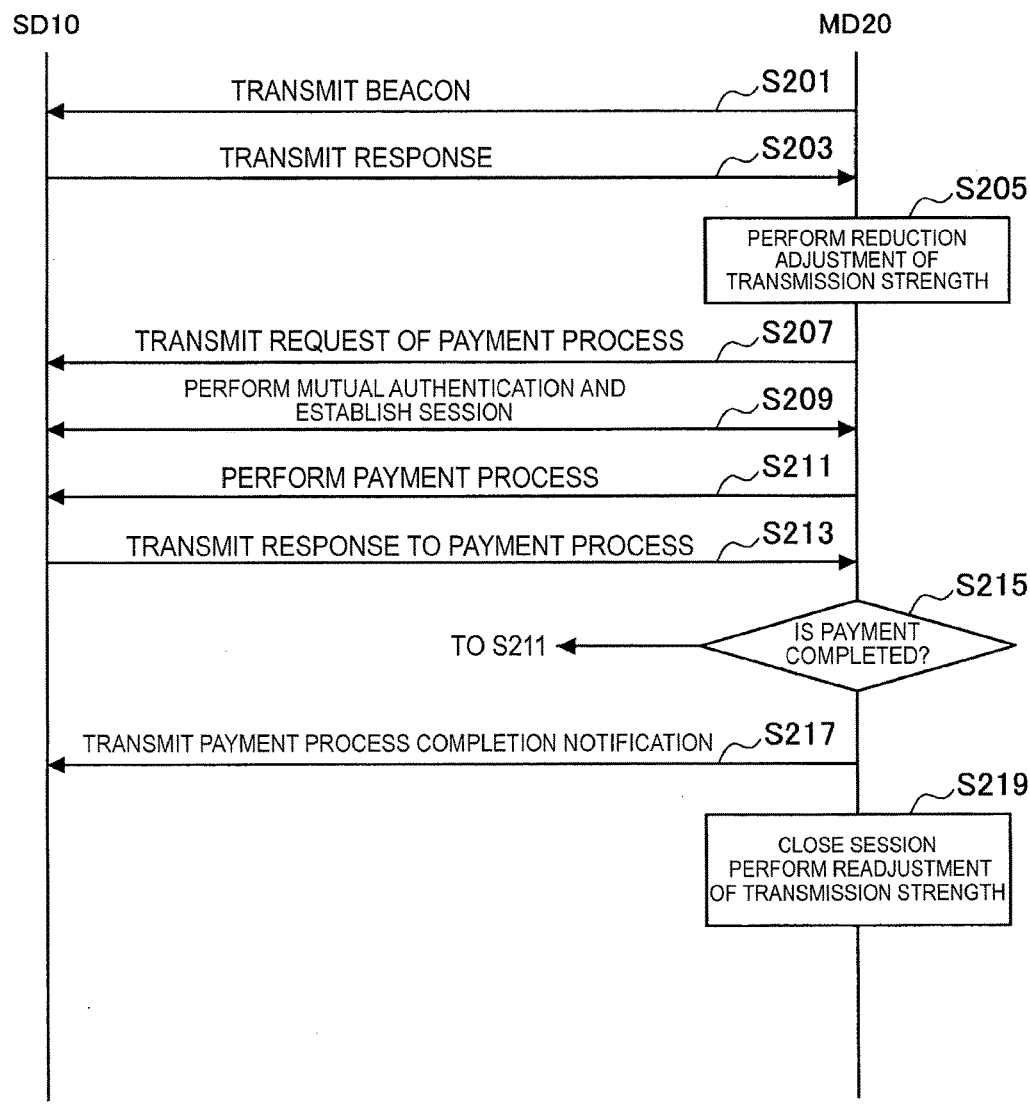
FIG. 5 is a sequence diagram for describing a second communication process example of a human body communication system according to this embodiment.

Next, with reference to FIG. 5, a second communication process example of the human body communication system 1 according to the present embodiment will be described. FIG. 5 is a sequence diagram for describing the second communication process example of the human body communication system 1 according to the present embodiment. The second communication process example is an example in which the user performs the payment process with the MD 20 by using the SD 10, in the same way as the first communication process example. Here, an example that adjusts the transmission strength of the MD 20 will be described.

First, the SD 10 receives a beacon that is transmitted to allow the MD 20 to detect the communication device which is the target of the payment process (S201). The beacon is a signal that is cyclically sent from the MD 20. The SD 10 that has received the beacon transmits a response to the MD 20 (S203).

The MD 20 that has received the response performs the adjustment that reduces the transmission strength of the MD 20 depending on the security level of the payment process (S205). Thereafter, the MD 20 requests the SD 10 to perform the payment process (S207). When the SD 10 receives the request relevant to the payment process from the MD 20, the mutual authentication process is performed between the SD 10 and the MD 20, and a session is established (S209). Note that the adjustment of the transmission strength of the MD 20 which is executed in step S205 may be performed after the request relevant to the payment process to the SD 10 by the MD 20, and may be performed after the mutual authentication process or the establishment of the session. That is, the transmission strength may be adjusted before a time point at which the payment process starts.

When the session is established, the payment process is performed between the SD 10 and the MD 20 (S211). Specifically, an instruction relevant to the payment process (for example, an instruction for balance confirmation or monetary amount decrease) is transmitted from the MD 20 to the SD 10, and the SD 10 transmits the information relevant to the reply to the instruction, to the MD 20 (S213). The payment process and its reply of step S211 and step S213 are repeatedly executed until the payment process is completed (S215).

When the payment process is completed, the MD 20 transmits a completion notification of the payment process to the SD 10 (S217). Next, the MD 20 performs readjustment, such as setting the transmission strength back to the original state, after the session with the SD 10 is closed after the completion of the payment process (S219).

In the above, the second communication process example has been described. According to the present exemplary process, the MD 20 adjusts the transmission strength of the MD 20 low, in response to the start and the end of the process via the communication with the SD 10. Thereby, the MD 20 can make the transmission strength lower while the process that is started by its own request is performed. Thus, the convenience of the user and the safety of the communication in using the SD 10 can be maintained, without transmitting to the SD 10 the information for adjusting the transmission strength of the SD 10.

<4.3. Third Communication Process Example (when Transmission Strength is Adjusted High)>

Next, a third communication process example of the human body communication system 1 according to the present embodiment will be described. In the present exemplary process, a case in which a user Ua that wears a portable communication device 10a and a user Ub that wears a portable communication device 10b exchange personal information stored in the respective communication devices 10 via human body communication will be described.

Figure 6:
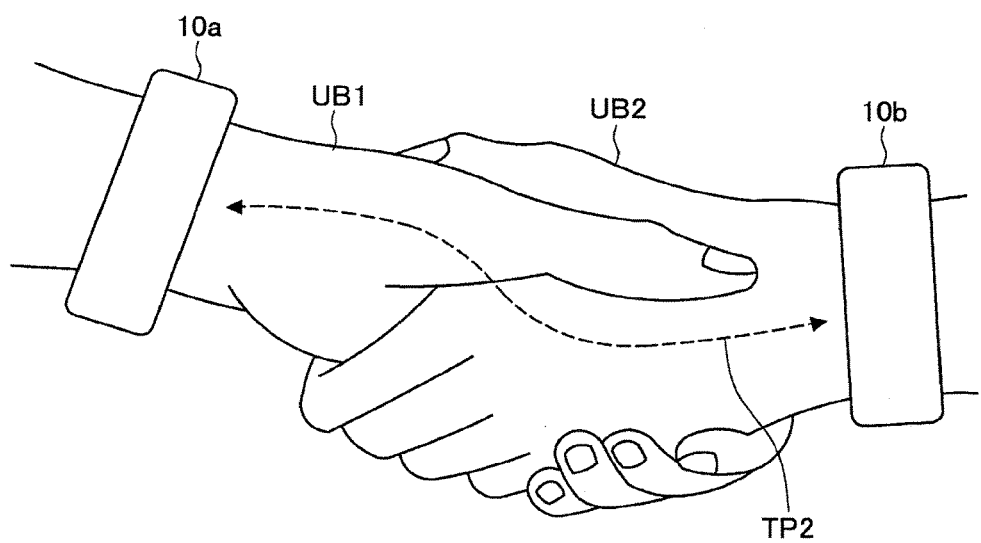
FIG. 6 is a diagram for describing an overview of a third communication process example of a human body communication system according to this embodiment.

FIG. 6 is a diagram for describing the overview of the third communication process example of the human body communication system 1 according to the present embodiment. Referring to FIG. 6, the user Ua that wears a band 10a that has a function of the communication device and the user Ub that wears a band 10b shake hands. In this case, a hand UB1 of the user Ua and a hand UB2 of the user Ub contact with each other, and thus a communication channel TP2 is formed on the hands UB1 and UB2 of each user, between the band 10a and the band 10b. Thus, the band 10a and the band 10b can perform the human body communication via the communication channel TP2.

However, in the present communication example, the communication channel is formed on the body of the two users. Hence, the communication channel TP2 includes portions that contact by the handshake of the two users, as illustrated in FIG. 6 for example. At these contact portions, the propagation property of the electric field can change largely, depending on the degree of close contact of the handshake by the two users. For example, as the close contact degree decreases, it becomes difficult for the electric field to propagate in the communication channel TP2, and it is conceived that the communication between the band 10a and the band 10b becomes difficult.

Hence, in the present communication example, the control units 110 of the band 10a and the band 10b not only reduce the transmission strength, but increase conversely. Thereby, even when the propagation property of the electric field in the communication channel TP2 decreases, the communication between the band 10a and the band 10b can be maintained. Thus, the convenience of the respective users who use the band 10a and the band 10b can be maintained. Note that there is also a possibility that the information is leaked to a third person that touches the users, by increasing the transmission strength. However, in the present exemplary process, under the condition that the respective users who use the band 10a and the band 10b exchange the personal information with each other, there is little possibility that the third person acquires the personal information fraudulently without being noticed by each user. Hence, the security level of the personal information exchange process by the contact of each user may be set low. Thus, increasing the transmission strength contributes to the convenience of the users. Note that the increase amount of the transmission strength is adjusted as appropriate depending on the security level of the process via the communication between the communication devices. Also, in order to avoid the electric fields that propagate through the space and the human body from cancelling each other, the increase amount of the transmission strength is adjusted lower than the level at which the electric field of the signal that is transmitted and received between the communication devices propagates through the space. Also, in the example illustrated in FIG. 6, the two users contact by shaking hands, but the contact method of each user is not limited particularly. In the following, a sequence of the process in the present communication example will be described.

Figure 7:
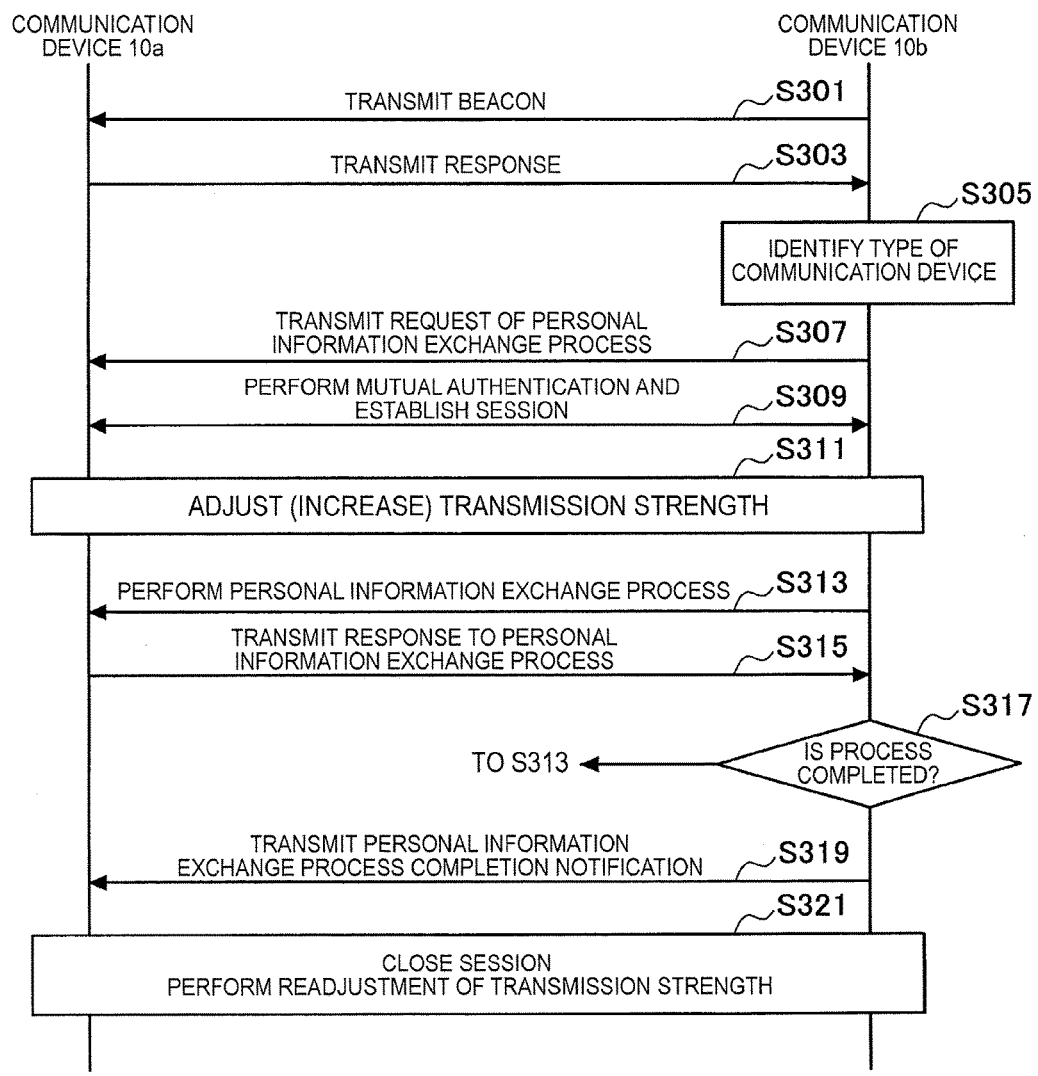
FIG. 7 is a sequence diagram for describing the third communication process example of a human body communication system according to this embodiment.

FIG. 7 is a sequence diagram for describing the third communication process example of the human body communication system 1 according to the present embodiment. The third communication process example is an example in which the first user that wears the communication device 10a and the second user that wears the communication device 10b perform the process for exchanging the personal information with each other.

First, the communication device 10a, which is a slave, receives a beacon that is transmitted for the communication device 10b to detect a target communication device of the personal information exchange process as a master (S301). The communication device 10a that has received the beacon transmits a response to the communication device 10b (S303). Note that, in the present exemplary process, the communication device 10a may transmit the beacon as the master, and the communication device 10b may transmit the response with regard to the beacon as the slave. Also, the communication device 10a and the communication device 10b may transmit beacons to each other, and the respective communication devices may transmit responses to each beacon. Thereby, the authentication process of the communication device of the partner is completed, at a stage where each communication device has received the response.

The communication device 10b that has received the response recognizes that the communications partner is the communication device 10a, and identifies the device type of the communication device 10a (S305). In the present exemplary process, the communication device 10b identifies that the communication device 10a is a portable communication device that has a band shape. In this case, the communication device 10b decides whether to increase or decrease the transmission strength on the basis of the type of the communication device 10a that is identified in step S305 or the security level relevant to the process via the communication. Then, the communication device 10b includes the decided adjustment detail into the request that is to be transmitted to the communication device 10a in step S307 which is described later.

Next, the communication device 10b requests the communication device 10a to perform the personal information exchange process (S307). At this time, a request for adjusting the transmission strength of the communication device 10a may be included in the request. When the request of the personal information exchange process is received, the mutual authentication process is performed between the communication device 10a and the communication device 10b, and a session is established (S309).

Thereafter, the communication device 10a and the communication device 10b adjust the transmission strength (S311). In the present exemplary process, the communication device 10a is a portable communication device, and is a process that exchanges the personal information of each other, and thus the communication device 10a and the communication device 10b perform the adjustment that increases the transmission strength. Note that the adjustment of the transmission strength of the communication device 10a and the communication device 10b that is executed in step S311 may be performed immediately before the mutual authentication process or the establishment of the session. Also, the adjustment of the transmission strength of the communication device 10b may be performed before performing the request of the personal information exchange process to the communication device 10a. The transmission strength is adjusted at an early stage of the establishment of the session, and thereby the success rate of the communication can become high. Thus, the communication is performed more efficiently. Also, the adjustment that increases the transmission strengths of both of the communication device 10a and the communication device 10b is performed in the present exemplary process, but only the transmission strength of one of the communication device 10a and the communication device 10b may be adjusted.

When the session is established, and the adjustment of the transmission strength is completed, the personal information exchange process is performed between the communication device 10a and the communication device 10b (S313, S315). Specifically, an instruction relevant to the personal information exchange process is transmitted from the communication device 10b to the communication device 10a, and the communication device 10a transmits a response to the instruction to the communication device 10b. The process and the reply of step S313 and step S315 are executed repeatedly, until the personal information exchange process is completed (S317).

When the personal information exchange process is completed, the communication device 10b transmits a completion notification of the personal information exchange process to the communication device 10a (S319). At this time, the communication device 10b may additionally transmit a request for setting the transmission strength back to the original state, to the communication device 10a. Next, the communication device 10a and the communication device 10b perform readjustment, such as setting the transmission strength back to the original state (S321). Note that the communication device 10a may readjust the transmission strength in accordance with the above request. Also, the communication device 10a and the communication device 10b may readjust the transmission strength, according to the timing at which the session of both devices is closed after the completion of the personal information exchange process. Further, the communication device 10a and the communication device 10b may use a session key that is shared by mutual authentication to encrypt the exchanged information, in order to prevent a third person from stealing a glance of the information relevant to the communication.

In the above, the third communication process example has been described. According to the present exemplary process, when executing the personal information exchange process via the communication between the communication device 10a and the communication device 10b, the communication device 10a and the communication device 10b adjust the respective transmission strengths high. Thereby, the communication quality between the communication devices can be maintained, even when the propagation property of the electric field of the communication channel between the users who use the respective communication devices can become low. Thus, the convenience of the user can be maintained.

In the above, each communication process example has been described. Note that, in each of the above communication process examples, the transmission strength of at least one of communication devices is the adjustment target, but the present technology is not limited to this example. For example, the reception strength of the communication device may be the target of the adjustment. More specifically, in the first communication process example, the MD 20 may send an instruction for making the transmission strength of the SD 10 lower, and make the reception strength of the MD 20 lower. Thereby, the conveyance range of the communication between the SD 10 and the MD 20 is further limited, and thus safer communication can be achieved. Also, in the second communication process example, the MD 20 may reduce not only the transmission strength of the MD 20, but the reception strength. Thereby, even when the communication strength of the SD 10 is not adjusted, the conveyance range of the communication between the SD 10 and the MD 20 can be limited more finely. Also, in the third communication process example, the reception strength of at least one of the communication device 10a and the communication device 10b may be made high. Thereby, the success rate of the communication between the communication device 10a and the communication device 10b can be further increased. Note that the communication device 10 may adjust the reception strength only.

Also, in the above communication process example, the communication device 10 adjusts the communication strength depending on the type of the communication device, but the present technology is not limited to this example. For example, the communication device 10 may adjust the communication strength according to the wearing position of the communication device. More specifically, when the communication device 10b which is the communications partner has the band shape, the communication device 10a may acquire the information relevant to the wearing position of the communication device 10b from the communication device 10b, and may adjust the communication strength on the basis of the information relevant to the wearing position. For example, the communication device 10a may adjust the communication strength, depending on whether the wearing position of the communication device 10b is the arm of handshake or the opposite arm. Thereby, the communication strength can be set according to the length of the communication channel between the communication devices. Note that this wearing position may be estimated by an altimeter, an acceleration sensor, or the like, which can be provided in the communication device 10 for example. Also, the communication strength may be adjusted on the basis of an input of the user via a button (not depicted) or the like.

5. EXEMPLARY HARDWARE CONFIGURATION

Figure 8:
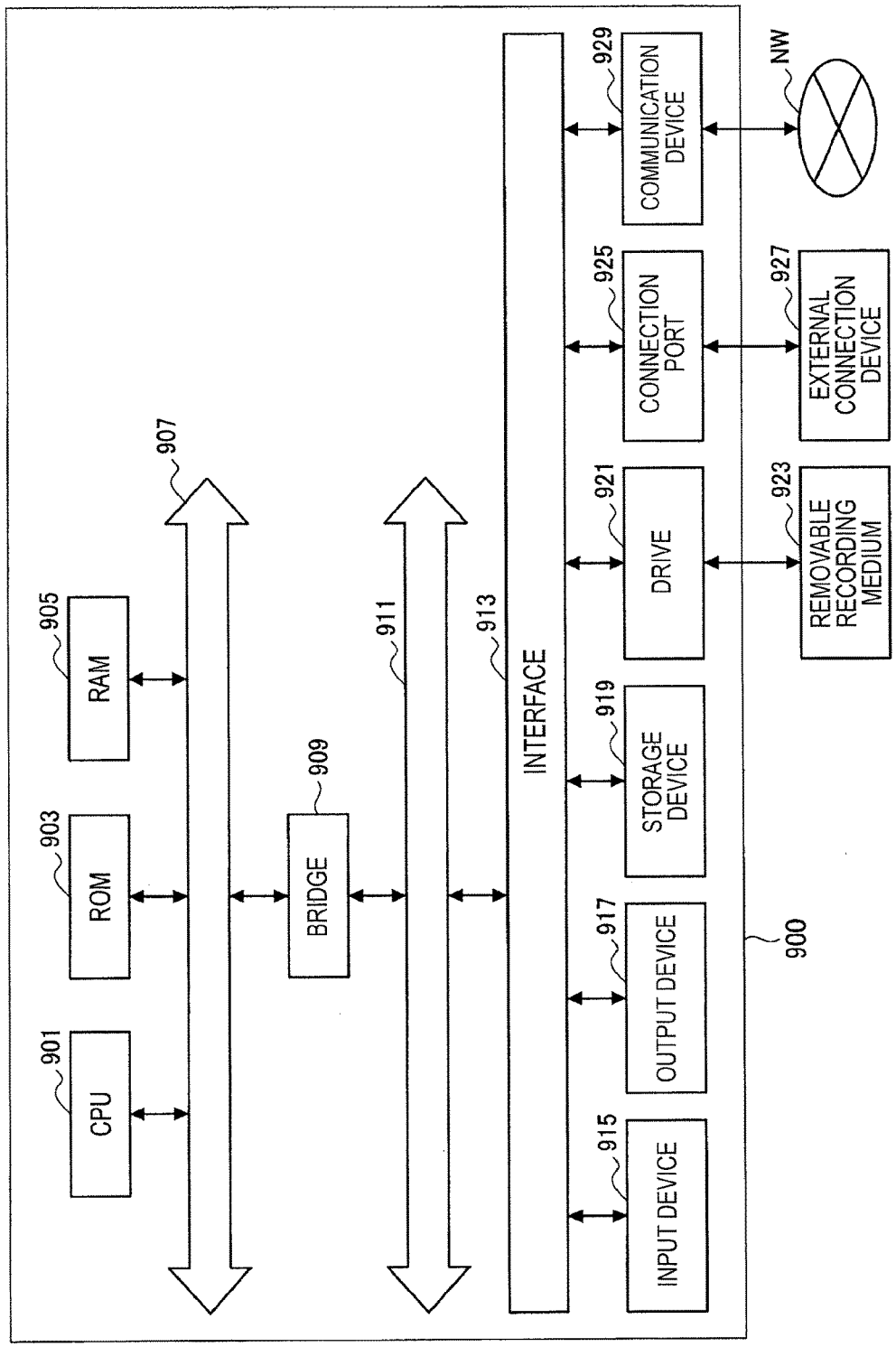
FIG. 8 is a block diagram illustrating an exemplary hardware configuration of a human body communication device according to an embodiment of the present disclosure.

Next, with reference to FIG. 8, a hardware configuration of the human body communication device according to an embodiment of the present disclosure will be described. FIG. 8 is a block diagram illustrating an exemplary hardware configuration of the human body communication device according to an embodiment of the present disclosure. An illustrated human body communication device 900 can configure the communication device 10 and the communication device 20 in the above embodiment, for example.

The human body communication device 900 includes a central processing unit (CPU) 901, a read only memory (ROM) 903, and a random access memory (RAM) 905. Also, the human body communication device 900 may include a host bus 907, a bridge 909, an external bus 911, an interface 913, an input device 915, an output device 917, a storage device 919, a drive 921, a connection port 925, and a communication device 929. The human body communication device 900 may include a processing circuit which is referred to as a digital signal processor (DSP) or an application specific integrated circuit (ASIC), instead of or together with the CPU 901.

The CPU 901 functions as an arithmetic processing device and a control device, and controls overall operation or its part in the human body communication device 900, in accordance with various types of programs recorded in the ROM 903, the RAM 905, the storage device 919, or a removable recording medium 923. For example, the CPU 901 controls the overall operation of each function unit included in the communication device 10 or the like in the above embodiment. The ROM 903 stores programs, calculation parameters, and the like which are used by the CPU 901. The RAM 905 primarily stores the programs that are used in the execution of the CPU 901, the parameters that change as appropriate in the execution of the programs, and the like. The CPU 901, the ROM 903, and the RAM 905 are connected to each other by the host bus 907 that is configured with an internal bus such as a CPU bus. Further, the host bus 907 is connected to the external bus 911 such as a peripheral component interconnect/interface (PCI) bus, via the bridge 909.

The input device 915 is a device that is operated by the user, such as a mouse, a keyboard, a touch panel, a button, a switch, and a lever, for example. The input device 915 may be a remote control device that utilizes infrared light and other radio waves, for example, and may be an external connection device 927 such as a mobile phone that can be operated by the human body communication device 900. The input device 915 includes an input control circuit that generates an input signal on the basis of the information input by the user and outputs the generated input signal to the CPU 901. The user inputs various types of data to the human body communication device 900 and instructs the processing operation, by operating this input device 915.

The output device 917 is configured with a device that can notify the acquired information visually or auditorily to the user. The output device 917 can be a display device such as an LCD, a PDP, an OELD, a sound output device such as a speaker and a headphone, a printer, or the like, for example. The output device 917 outputs a result obtained by the process of the human body communication device 900 as video such as text or image, and outputs as sound such as acoustic sound.

The storage device 919 is a data storage device that is configured as an example of the storage unit of the human body communication device 900. The storage device 919 is configured with a magnetic storage unit device such as a hard disk drive (HDD), a semiconductor storage device, a light storage device, a magneto optical storage device, or the like, for example. This storage device 919 stores programs and various types of data which are executed by the CPU 901, various types of data that is acquired from outside, and the like.

The drive 921 is a reader/writer for the removable recording medium 923 such as a magnetic disk, an optical disc, a magneto-optical disk, or a semiconductor memory, and is provided inside or outside the human body communication device 900. The drive 921 reads out the information recorded in the removable recording medium 923 that is worn, and outputs the read information to the RAM 905. Also, the drive 921 writes a record into the removable recording medium 923 that is worn.

The connection port 925 is a port for connecting a device directly to the human body communication device 900. The connection port 925 can be a universal serial bus (USB) port, an IEEE1394 port, a small computer system interface (SCSI) port, or the like, for example. Also, the connection port 925 may be an RS-232C port, an optical audio terminal, a high-definition multimedia interface (HDMI) (registered trademark) port, or the like. Various types of data can be exchanged between the human body communication device 900 and the external connection device 927, by connecting the external connection device 927 to the connection port 925.

The communication device 929 is a communication interface that is configured with a communication device for connecting to a communication network NW or the like, for example. The communication device 929 can be a wired or wireless local area network (LAN), a Bluetooth (registered trademark), a wireless USB (WUSB) communication card, or the like, for example. Also, the communication device 929 may be an optical communication router, an asymmetric digital subscriber line (ADSL) router, various types of communication modems, or the like. The communication device 929 transmits and receives a signal or the like by using a predetermined protocol such as TCP/IP, with the Internet or another communication device, for example. Also, the communication network NW that is connected to the communication device 929 is a network that is connected in a wired or wireless manner, and is the Internet, a home LAN, an infrared communication, a radio wave communication, a satellite communication, or the like, for example. Further, the communication device 929 includes a device of the human body communication.

In the above, an example of the hardware configuration of the human body communication device 900 has been illustrated.

6. CONCLUSION

It should be understood by those skilled in the art that various modifications, combinations, sub-combinations and alterations may occur depending on design requirements and other factors insofar as they are within the scope of the appended claims or the equivalents thereof.

Note that each step in the process of the human body communication device of the present specification is needless to be processed in temporal sequence in the order described as the flowchart necessarily. For example, each step in the process of the human body communication device may be processed in the order that differs from the order described as the flowchart, and may be processed in parallel.

Moreover, a computer program for providing the function equivalent to each element of the above human body communication device can also be created in the hardware such as the CPU, the ROM, and the RAM which are provided in the human body communication device. Moreover, a storage medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) A human body communication device including:
  a control unit configured to adjust a communication strength on the basis of information relevant to a process using human body communication.

(2) The human body communication device according to (1), wherein
  the control unit adjusts the communication strength on the basis of information of a process executed by an application.

(3) The human body communication device according to (2), wherein
the control unit adjusts the communication strength depending on a security level of the process executed by the application.
(4) The human body communication device according to (3), wherein
when the security level is higher than a predetermined threshold value, the control unit adjusts the communication strength such that the communication strength is lower than a predetermined strength.
(5) The human body communication device according to any one of (1) to (4), wherein
the control unit adjusts the communication strength on the basis of a notification of the process transmitted from a first communication device.
(6) The human body communication device according to any one of (1) to (5), wherein
the control unit adjusts the communication strength on the basis of a process for a connection with a first communication device.
(7) The human body communication device according to (6), wherein
the control unit adjusts the communication strength, depending on whether or not communication connection with the first communication device is established.
(8) The human body communication device according to any one of (1) to (7), wherein
the control unit adjusts the communication strength depending on a type of a first communication device which is a target of the process.
(9) The human body communication device according to any one of (1) to (8), wherein
when the communication strength is adjusted by the control unit, the control unit readjusts the communication strength after a predetermined time has elapsed from the adjustment of the communication strength.
(10) The human body communication device according to any one of (1) to (9), wherein
when the communication strength is adjusted by the control unit, the control unit readjusts the communication strength after the process ends.
(11) The human body communication device according to any one of (1) to (10), wherein
when the communication strength is adjusted by the control unit, the control unit readjusts the communication strength after a notification is sent from a first communication device.
(12) The human body communication device according to any one of (1) to (11), wherein
the control unit adjusts the communication strength in accordance with a consumption state of electric power of the human body communication device.
(13) The human body communication device according to any one of (1) to (12), wherein
the process includes at least one of a process of payment and a process of personal information.
(14) The human body communication device according to any one of (1) to (13), wherein
the communication strength includes at least one of a transmission strength and a reception strength.
(15) A human body communication method including:
adjusting, by a processor, a communication strength on the basis of information relevant to a process using human body communication.

(16) A program for causing a computer to function as a control unit configured to adjust a communication strength on the basis of information relevant to a process using human body communication.

What is claimed is:
1. A human body communication device comprising:
a control circuitry configured to
receive a notification from a first communication device, the notification indicating a security level of a process performed between the human body communication device and the first communication device using human body communication;
adjust a communication strength of the human body communication from an original state based on the security level of the process indicated by the notification;
after the communication strength is adjusted, perform a mutual authentication with the first communication device, and establish a session for the human body communication with the first communication device;
after the session is established, perform the process between the human body communication device and the first communication device using the human body communication using the adjusted communication strength; and
after performing the process, readjust the communication strength to the original state.
2. The human body communication device according to claim 1, wherein
when the security level is higher than a predetermined threshold value, the control circuitry is configured to make the communication strength lower than a predetermined strength.
3. The human body communication device according to claim 1, wherein
the control circuitry is configured to adjust the communication strength on the basis of a process for a connection with the first communication device.
4. The human body communication device according to claim 3, wherein
the control circuitry is configured to adjust the communication strength, depending on whether or not communication connection with the first communication device is established.
5. The human body communication device according to claim 1, wherein
the control circuitry is configured to adjust the communication strength depending on a type of the first communication device.
6. The human body communication device according to claim 1, wherein
when the communication strength is adjusted by the control circuitry, the control circuitry is configured to readjust the communication strength after a predetermined time has elapsed from the adjustment of the communication strength.
7. The human body communication device according to claim 1, wherein
when the communication strength is adjusted by the control circuitry, the control circuitry is configured to readjust the communication strength after the process ends.
8. The human body communication device according to claim 1, wherein
when the communication strength is adjusted by the control circuitry, the control circuitry is configured to readjust the communication strength after another notification is sent from the first communication device.

9. The human body communication device according to claim 1, wherein
the control circuitry is configured to adjust the communication strength in accordance with a consumption state of electric power of the human body communication device.

10. The human body communication device according to claim 1, wherein
the process includes at least one of a process of payment and a process of personal information.

11. The human body communication device according to claim 1, wherein
the communication strength includes at least one of a transmission strength and a reception strength.

12. The human body communication device according to claim 1, wherein
the control circuitry is configured to
receive a beacon from the first communication device; and
transmit a response signal to the first communication device in response to receiving the beacon, and
the first communication device transmits the notification in response to receiving the response signal from the human body communication device.

13. A human body communication method comprising:
receiving a notification from a first communication device, the notification indicating a security level of a process performed between the human body communication device and the first communication device using human body communication;
adjusting, by a processor, a communication strength of the human body communication from an original state based on the security level of the process indicated by the notification;
after the communication strength is adjusted, performing, by the processor, a mutual authentication with the first communication device, and establish a session for the human body communication with the first communication device;
after the session is established, performing, by the processor, the process between the human body communication device and the first communication device using the human body communication using the adjusted communication strength; and
after performing the process, readjusting, by the processor, the communication strength to the original state.

14. A non-transitory, computer-readable medium storing a program for causing a computer to
receive a notification from a first communication device, the notification indicating a security level of a process performed between the human body communication device and the first communication device using human body communication;
adjust a communication strength of the human body communication from an original state based on the security level of the process indicated by the notification;
after the communication strength is adjusted, perform a mutual authentication with the first communication device, and establish a session for the human body communication with the first communication device;
after the session is established, perform the process between the human body communication device and the first communication device using the human body communication using the adjusted communication strength; and
after performing the process, readjust the communication strength to the original state.

\* \* \* \* \*